United States Patent
Nyhuis

(10) Patent No.: US 9,815,722 B2
(45) Date of Patent: Nov. 14, 2017

(54) METHOD AND INSTALLATION FOR TREATING WASTEWATER CONTAINING AMMONIA

(71) Applicant: cyklar-stulz GmbH, Gommiswald (CH)

(72) Inventor: Geert Nyhuis, Gommiswald (CH)

(73) Assignee: CYKLAR-STULZ GMBH, Gommiswald (CH)

( * ) Notice: Subject to any disclaimer, the term of this patent is extended or adjusted under 35 U.S.C. 154(b) by 813 days.

(21) Appl. No.: 14/085,841

(22) Filed: Nov. 21, 2013

(65) Prior Publication Data

US 2014/0305867 A1    Oct. 16, 2014

(30) Foreign Application Priority Data

Apr. 16, 2013   (EP) .................................... 13401040

(51) Int. Cl.
  C02F 3/30   (2006.01)
  C02F 3/12   (2006.01)
  C02F 1/38   (2006.01)

(52) U.S. Cl.
  CPC ............ C02F 3/307 (2013.01); C02F 3/1221 (2013.01); *C02F 1/385* (2013.01); *Y02W 10/15* (2015.05)

(58) Field of Classification Search
  None
  See application file for complete search history.

(56) References Cited

U.S. PATENT DOCUMENTS

| 3,764,523 A | * | 10/1973 | Stankewich, Jr. | ........ C02F 1/52 210/604 |
| 3,904,518 A | * | 9/1975 | Hutton | .................... B01D 21/00 210/610 |
| 5,487,829 A | * | 1/1996 | Safferman | ............... C02F 3/085 210/151 |
| 5,747,311 A | * | 5/1998 | Jewell | ..................... C02F 3/087 210/600 |
| 6,019,825 A | * | 2/2000 | Greene | ............. B01D 17/0217 210/512.1 |

(Continued)

FOREIGN PATENT DOCUMENTS

| CN | 102745810 A | 10/2012 |
| CN | 102791641 A | 11/2012 |

(Continued)

OTHER PUBLICATIONS

Grontmij, Sharon Nitrogen Removal over Nitrite, n.d.*

*Primary Examiner* — Krishnan S Menon
*Assistant Examiner* — Brad Gordon
(74) *Attorney, Agent, or Firm* — Leydig, Voit & Mayer Ltd.

(57) ABSTRACT

A method and installation for treating wastewater containing ammonia includes feeding activated sludge from an aeration tank into a hydrocyclone. The sludge is separated into a specifically heavy fraction containing mostly anaerobic ammonia-oxidizing bacteria (anammox) and a specifically light fraction containing mostly aerobic oxidizing bacteria (AOB), which are returned to the aeration tank. The hydrocyclone includes a roughened inner wall surface for at least partially removing an organic or inorganic cover layer disposed on the anaerobic ammonium-oxidizing bacteria (anammox).

8 Claims, 3 Drawing Sheets

(56) References Cited

U.S. PATENT DOCUMENTS

| | | | |
|---|---|---|---|
| 8,911,628 B2 | 12/2014 | Nyhuis | |
| 2007/0218537 A1 | 9/2007 | Furukawa et al. | |
| 2009/0218281 A1* | 9/2009 | Sauvignet | C02F 3/06 210/608 |
| 2009/0272690 A1 | 11/2009 | Wett | |
| 2009/0288560 A1* | 11/2009 | Ruppel | F01M 13/04 96/408 |
| 2011/0198284 A1* | 8/2011 | Nyhuis | C02F 3/302 210/626 |

FOREIGN PATENT DOCUMENTS

| | | |
|---|---|---|
| CN | 202643430 U | 1/2013 |
| DE | 10023009 A1 | 12/2000 |
| EP | 0327184 A1 | 8/1989 |
| EP | 2163524 B1 | 12/2011 |
| FR | 2962051 A1 | 1/2012 |
| GB | 190209920 A * | 0/1902 |
| JP | 2006325512 A | 12/2006 |
| JP | 2012177690 A | 9/2012 |
| JP | 2013027845 A | 2/2013 |
| WO | WO 2007033393 A1 | 3/2007 |

* cited by examiner

METHOD AND INSTALLATION FOR TREATING WASTEWATER CONTAINING AMMONIA

CROSS REFERENCE TO RELATED APPLICATIONS

This application claims priority from European Patent No 13 401 040.4, filed Apr. 16, 2013, which is hereby incorporated by reference herein in its entirety.

FIELD

The invention relates to a method for treating wastewater containing ammonia in a deammonifying installation having at least one aeration tank.

BACKGROUND

Moreover, the invention relates to a deammonifying installation for treating wastewater containing ammonia, having at least one aeration tank and at least one hydrocyclone for separating sludge from the aeration tank into a specifically heavy fraction containing mostly anaerobic ammonium-oxidizing bacteria (anammox) and into a specifically light fraction, whereby the hydrocyclone has an inlet that is flow-connected to the aeration tank and that serves to feed in the sludge, an underflow that is flow-connected to the aeration tank and that serves to return the separated specifically heavy fraction to the aeration tank, and an overflow that serves to discharge the separated specifically light fraction from the hydrocyclone.

The activated sludge process is a process for biological wastewater treatment in wastewater treatment plants. Here, the usually municipal wastewater is virtually rid, that is to say, cleaned of organic impurities through the metabolic activity of aerobic chemoorganoheterotrophic microorganisms, the so-called activated sludge. The process begins after the separation or settling of the coarse fractions that are dewatered, separated, digested and incinerated. For municipal wastewater, this process is one of the classic intensive treatment processes. An advantage is the general applicability and good cleaning effect for wastewater in order to reduce the suspended matter content, the chemical oxygen demand (COD), the five-day biochemical oxygen demand ($BOD_5$), and the nitrogen compounds (N).

Installations that run on the basis of the activated sludge process can be operated continuously, that is to say, in uninterrupted operation (conventional activated sludge installation), as well as discontinuously (Sequencing Batch Reactor—SBR installation). Moreover, there are also so-called membrane activated sludge installations in which a membrane is used to separate the treated water from the sludge. All of these variants have in common the fact that bacteria mass or biomass that is suspended in water and that is also referred to as activated sludge takes over the biological cleaning of the wastewater. For this purpose, each installation has at least one aeration tank in which the wastewater is mixed with the activated sludge and is thus brought into intensive contact with the activated sludge.

The biomass formed in the aeration tank during the aerobic biological wastewater treatment by means of the degradation of the constituents present in the wastewater is referred to as activated sludge. It consists mainly of bacteria, fungi, protozoa, EPS and other constituents. Microscopic examinations confirm that activated sludge flocs of bacteria and protozoa are "activated". This is why they are called activated sludge. During the technical utilization in the activated sludge process, the activated sludge is usually present in the form of activated sludge flocs that, in addition to living and dead biomass, also contain adsorbed and embedded organic compounds and minerals.

In the activated sludge process, after the contaminants in the wastewater have been degraded by activated sludge, this sludge is separated from the cleaned water in the so-called secondary treatment stage. Most of the separated sludge is returned to the aeration tank as returned activated sludge or recirculated activated sludge. This ensures that the activated sludge concentration in the aeration tank can be maintained. The activated flocs contained in the return activated sludge renew the cleaning capacity of the activation process. The non-recirculated, smaller volume flow of activated sludge is called the surplus sludge. In other words, the surplus sludge is the portion of the activated sludge that is withdrawn and pumped into the sludge treatment stage in order to keep the desired biomass concentration constant. As a rule, this removed biomass growth is fed, together with the primary sludge, to the sludge digestion stage and finally to the sludge dewatering stage.

Nowadays, conventional wastewater treatment plants, almost exclusively make use of biological nitrification/denitrification for purposes of nitrogen elimination. The term nitrogen elimination refers to the conversion of biologically available nitrogen compounds such as ammonia ($NH_4$), nitrite ($NO_2$) and nitrate ($NO_3$) into elementary nitrogen ($N_2$), which gases out into the ambient air as a harmless end product. During the nitrification, ammonia is oxidized by oxygen via the intermediate product nitrite to form nitrate. During the subsequent denitrification, the nitrate is reduced in a first reduction step to form nitrite and in a second reduction step to form nitrogen.

Biological nitrification/denitrification has the drawback of a high oxygen demand and thus a high energy consumption. Moreover, during the denitrification, organic carbon is consumed, which has a negative effect on the further cleaning process and on the sludge properties.

With deammonification, as compared to nitrification/denitrification, only 40% of the oxygen is needed or the energy consumption for the nitrogen elimination is reduced by 60%. Deammonification is an autotrophic process in which no organic carbon is needed. Consequently, the rest of the cleaning process becomes more stable.

Deammonification is an efficient process for biological nitrogen elimination, for example, also in the case of wastewater streams with high ammonia concentrations. Two bacteria groups are involved in biological deammonification with suspended biomass: on the one hand, the aerobic ammonia-oxidizing bacteria (AOB), which convert ammonia into nitrite and, on the other hand, the anaerobic ammonia-oxidizing and elementary-nitrogen-producing bacteria (anammox), especially Planctomycetes, which carry out this step using the previously produced nitrite.

Relative to the mass conversion, the aerobic ammonia-oxidizing bacteria (AOB) produce ten times more new bacteria mass than the anaerobic ammonium-oxidizing bacteria (anammox). Therefore, the retention time of the sludge in a single-sludge system has to be at least so long that the slow-growing anaerobic ammonium-oxidizing bacteria (anammox) can become established.

Methods for one-stage or two-stage deammonification are already quite well known, for example, from international patent application WO 2007/033393 A1 or European patent specification EP 0 327 184 B1.

A drawback here is particularly the much longer generation times for the anaerobic ammonium-oxidizing bacteria (anammox), which is longer by a factor of 10 than those for the aerobic ammonia-oxidizing bacteria (AOB). As a result, a stable system can only form when the retention time of the sludge or the bacteria in the tank is sufficiently long. This, in turn, calls for large reaction volumes and correspondingly dimensioned tanks.

Moreover, an adequately high wastewater temperature (>25° C. [77° F.]) is the basis for the existence or growth of the anaerobic ammonium-oxidizing bacteria (anammox). Heating up the wastewater, however, requires a great deal of resources in terms of energy, which is why the processes described are not cost-effectively feasible or useful for wastewater that is at a low temperature.

Moreover, the presence of groups of bacteria (NOB) that convert the formed nitrite into nitrate under aerobic conditions has proven to be disadvantageous. This group of bacteria has generation times that are shorter by a factor of 10 than those of the anaerobic ammonium-oxidizing bacteria (anammox). In order to compensate for these different generation times, it has already been considered to carry out the aerated phase of the single-sludge system at a very low oxygen level (<0.4 mg $O_2$/l). With this approach, the nitrate-forming bacteria (NOB) have little or no oxygen available for converting the nitrite which, in turn, is very advantageous for the anaerobic ammonium-oxidizing bacteria (anammox). The reduced oxygen supply during the aerated phase, however, has the drawback that the aerobic conversion of the ammonia into nitrite also transpires under oxygen-limited conditions and consequently, takes place very slowly.

The slow-growing Planctomycetes, which have a generation time that is longer by a factor of 10 than the nitrite-forming bacteria (AOB), have the special property that very many individual bacteria form a spherical conglomerate, so-called Planctomycete granules. These Planctomycete granules have a very high density (1010 bacteria/ml).

In addition to containing the ammonia that is to be degraded, the wastewater to be treated also contains organic substances such as organic acids and other organic substances that are described by the sum parameter "dissolved COD" and that can have values of several hundred mg/l (typically 100 to 2000 mg/l). These organic substances are degraded by very fast-growing heterotrophic bacteria. The heterotrophic bacteria often settle on the Planctomycete granules and coat them with an organic cover layer or covering. The cover layer limits diffusion, thereby making the conversion of ammonia ($NH_4$) and nitrite ($NO_2$) into elementary nitrogen ($N_2$) more difficult, since the substrate ($NH_4$ and $NO_2$) first has to pass through this cover layer before it is available to the Planctomycetes for the conversion.

The wastewater that is to be treated, often wastewater from sludge digestion (anaerobic stabilization of sludge) or general wastewater with a high nitrogen concentration, also often contains—in addition to ammonia ($NH_4$) and organic degradable substances—inorganic substances such as, for instance, calcium carbonate and/or struvite, which can likewise be deposited onto the surface of the Planctomycete granules. Suspended matter present in the wastewater, which can amount to several hundred mg/l (typically 50 to 1000 mg/l), form or enlarge the cover layer on the Planctomycete granules.

Due to the diffusion-limiting effect, the cover layer on the Planctomycete granules leads to a massive drop in the capacity of the deammonifying installation. Comparative measurements between exposed, uncovered Planctomycete granules and granules with a cover layer have shown a difference in the specific conversion rate of nitrogen (mg H/g TS) by a factor of 4 to 6.

The deposits or cover layers on the Planctomycete granules can already be seen with the naked eye. Exposed, uncovered granules are an intensive red/rust-red color, and the granules coated by a cover layer are slightly reddish/brown to dark brown in color, depending on the extent to which they are coated.

European patent specification EP 2 163 524 B1 has already described a method and a deammonifying installation of the above-mentioned type. In the disclosed method, in order to keep the biomass concentration in the installation constant, the surplus sludge that is withdrawn from the installation is not disposed of and transported to the sludge digestion stage, but rather, it is fed into a hydrocyclone where it is separated into a specifically heavy fraction (underflow) and a specifically light fraction (overflow). In this process, the density differences between the two bacteria groups (anammox and AOB) present in the surplus sludge are used to separate the surplus sludge into a heavy phase containing mostly the anaerobic ammonium-oxidizing bacteria (anammox), and a light phase (AOB). By returning the bacteria group (anammox) contained in the heavy phase to the aeration tank of the installation, the slow-growing bacteria group (anammox) becomes established in the aeration tank.

The two sludge fractions that are to be separated, namely, the specifically light fraction and the specifically heavy fraction, differ from each other markedly in terms of their density as well as in terms of their biological characteristics. These are completely different groups of bacteria. The Planctomycete granules consisting of several individual bacteria have a much greater density than the aerobic ammonia-oxidizing bacteria (AOB) that are present in flocculent form. Due to the density differences that exist between the two bacteria groups, the discharged surplus sludge can be separated into a heavy phase containing the Planctomycete granules and a light phase containing the flocculent sludge fraction. Owing to the density differences, the Planctomycete granules are considerably heavier than the flocs.

SUMMARY

In an embodiment, the present invention provides a method for treating wastewater containing ammonia in a deammonifying installation having at least one aeration tank includes converting ammonia into nitrite using aerobic oxidizing bacteria (AOB) and converting ammonia and nitrite into elementary nitrogen using anaerobic ammonium-oxidizing bacteria (anammox). Activated sludge is fed, at least at times, from the aeration tank into a hydrocyclone. The sludge is separated in the hydrocyclone into a specifically heavy fraction containing mostly the anaerobic ammonia-oxidizing bacteria (anammox) and a specifically light fraction containing mostly aerobic ammonia-oxidizing bacteria (AOB). During the separating of the activated sludge, the anaerobic ammonium-oxidizing bacteria (anammox), having a greater density than the aerobic ammonia-oxidizing bacteria (AOB), are deposited onto a roughened inner wall surface of the hydrocyclone as a result of centrifugal and flow forces in the hydrocyclone. Abrasive forces generated due to a relative movement between the fast-moving anaerobic ammonium-oxidizing bacteria (anammox) and stationary roughened inner wall surface of the hydrocyclone at least partially remove an organic or inorganic cover layer disposed on the anaerobic ammonium-oxidizing bacteria (anammox). The specifically heavy fraction and the specifically light fraction are returned to the aeration tank.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
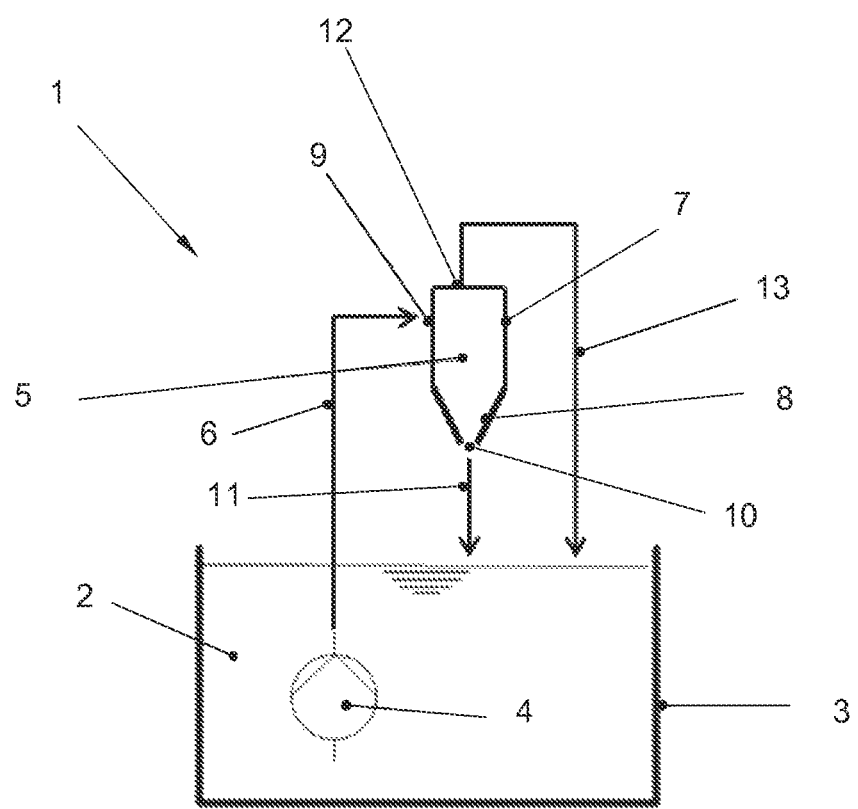
FIG. 1 shows an installation for treating wastewater containing ammonia, in a simplified schematic depiction.

In an embodiment, the present invention provides a method for treating wastewater containing ammonia in a deammonifying installation having at least one aeration tank, in which first of all, ammonia is converted into nitrite by means of aerobic oxidizing bacteria (AOB), and subsequently, ammonia and nitrite are converted into elementary nitrogen by means of anaerobic ammonium-oxidizing bacteria (anammox), especially Planctomycetes, and in which sludge is fed from the aeration tank into a hydrocyclone, where it is separated into a specifically heavy fraction containing mostly the anaerobic ammonia-oxidizing bacteria (anammox) and into a specifically light fraction, whereby the specifically heavy fraction is returned to the aeration tank.

In an embodiment, the present invention provides an improved method for treating wastewater containing ammonia. Moreover, in an embodiment, the invention provides an improved deammonifying installation for treating wastewater containing ammonia.

Before this backdrop, according to an embodiment of the invention, a method for treating wastewater containing ammonia is provided in which activated sludge is fed from the aeration tank into the hydrocyclone, at least at times, and in which, after the separation of the activated sludge in the hydrocyclone, the specifically heavy fraction as well as the specifically light fraction containing mostly the aerobic ammonia-oxidizing bacteria (AOB) are returned again to the at least one aeration tank of the installation, whereby, during the separation of the activated sludge in the hydrocyclone, the anaerobic ammonium-oxidizing bacteria (anammox) having a greater density than the aerobic ammonia-oxidizing bacteria (AOB) are deposited onto a roughened inner wall surface of the hydrocyclone due to centrifugal and flow forces in the hydrocyclone, and moreover, abrasive forces are generated due to a relative movement between the fast-moving anaerobic ammonium-oxidizing bacteria (anammox) and the stationary roughened inner wall surface of the hydrocyclone, whereby these abrasive forces at least partially remove an organic or inorganic cover layer that is present on the anaerobic ammonium-oxidizing bacteria (anammox), especially on the Planctomycete granules.

In this manner, an improved method for treating wastewater containing ammonia is put forward since the conversion of ammonia and nitrite into elementary nitrogen by means of the anaerobic ammonium-oxidizing bacteria (anammox) is facilitated owing to the removal of the diffusion-limiting organic or inorganic cover layer that is present on the anaerobic ammonium-oxidizing bacteria (anammox) that are present in the form of Planctomycete granules. In this process, the cover layer is removed from or washed off the granules so gently that the granules themselves are not destroyed by the abrasive forces. It is of crucial importance to retain the granular structure for purposes of the envisaged nitrogen conversion in the installation. Since, after being separated in the hydrocyclone, the specifically heavy fraction as well as the specifically light fraction are returned to the same aeration tank from which the activated sludge that was fed into the hydrocyclone had been discharged, the ratio of the types of bacteria needed for the deammonification, namely, the anaerobic ammonium-oxidizing bacteria (anammox), especially Planctomycete granules, and the aerobic ammonia-oxidizing bacteria (AOB), especially Nitrosomas, is retained in the installation or in the biological system. At the same time, the nitrogen conversion is increased due to the removal of the cover layer. Since the flocculent aerobic ammonia-oxidizing bacteria are mostly present in the specifically light fraction of the activated sludge, it is indispensable for an efficient deammonification and for a good nitrogen conversion that not only the Planctomycete granules but also the specifically light fraction are returned to the aeration tank.

Consequently, in the hydrocyclone, the Planctomycete granules that are present as a conglomerate of several individual bacteria are deposited onto the roughened inner wall surface of the hydrocyclone due to the fact that the aerobic ammonia-oxidizing bacteria have a greater density than the flocculent bacteria. This roughened inner wall surface has a greater roughness than an adjacent inner wall surface or an inner wall surface of a conventional hydrocyclone. The inner wall surface itself can be roughened or else it can have a surface coating that is roughened or that has greater roughness. Due to the contact with the roughened inner wall surface, abrasive forces are introduced into the granules, and these forces are configured in such a way that the organic or inorganic cover layer that is present on the granules is removed gently without destroying the conglomerate of individual bacteria or the individual bacteria themselves. After the cover layer has been removed, the granules are returned to the aeration tank via the underflow of the hydrocyclone.

Due to the fact that the aerobic ammonia-oxidizing bacteria (AOB), which are present in flocculent form and mostly in the light fraction, have a much lower density than the granules, they are carried out through the overflow of the hydrocyclone by means of an inner eddy that is formed and directed upwards inside the hydrocyclone. In this manner, these bacteria (AOB) do not come into intensive contact with the roughened inner wall in the cone, so that these bacteria flocs are not exposed to the abrasive forces and can be discharged from the hydrocyclone and returned to the aeration tank essentially without being damaged. In this manner, the settling properties of the flocculent bacteria, which are worse anyway, can be at least retained. In contrast, a destruction of the floc structure would impair the settling properties to such an extent that the aerobic ammonia-oxidizing bacteria (AOB) needed for the deammonification would be carried out of the biological system or out of the aeration tank together with the sludge water.

Thanks to the method according to the invention and the removal of the organic or inorganic cover layer on the Planctomycete granules that has a diffusion-limiting effect, the specific conversion rate of nitrogen (mg H/g TS) is increased by a factor of 4 to 6.

Moreover, in actual practice, it has proven to be especially advantageous that the activated sludge in the hydrocyclone is exposed to centrifugal forces that are 30 to 180 times that of the acceleration of gravity. At centrifugal forces in this order of magnitude and at the resultant high velocities of the activated sludge, especially of the heavy fractions, the cover layer on the Planctomycete granules is removed almost completely. At low values, little or none of the cover layer is abraded, and at higher values, the granules consisting of several individual bacteria and/or the individual bacteria themselves are destroyed.

Moreover, it has proven to be advantageous that the specifically heavy fraction separated in the hydrocyclone and the specifically light fraction of the activated sludge are both returned in their entirety to the aeration tank. Returning these fractions ensures that the activated sludge fed from the aeration tank into the hydrocyclone is returned in its entirety to the same aeration tank, thus providing a balanced ratio between the types of bacteria (anammox, AOB) involved in the deammonification in the aeration tank of the installation.

An advantageous refinement of the present method is also achieved in that, during the separation of the activated sludge in the hydrocyclone, the specifically heavy fraction containing mostly the anaerobic ammonia-oxidizing bacteria makes contact with the roughened inner wall located in a conical segment of the hydrocyclone and is subsequently discharged from the hydrocyclone through an underflow of the hydrocyclone, while the specifically light fraction containing mostly the aerobic ammonia-oxidizing bacteria (AOB) makes contact with a smooth inner wall surface in a cylindrical segment of the hydrocyclone and is subsequently discharged from the hydrocyclone through an overflow of the hydrocyclone. This achieves that the abrasive forces act exclusively on the Planctomycete granules and consequently remove the organic or inorganic cover layer, whereas the aerobic ammonia-oxidizing bacteria (AOB) exclusively come into contact with the smooth inner wall surface of the cylindrical segment. In this manner, a destruction of the aerobic ammonia-oxidizing bacteria that are present in flocculent form can be prevented. The selected roughness of the inner wall surface depends on the diameter of the cylindrical segment of the hydrocyclone. The larger the diameter of the cylindrical segment, the larger the selected roughness should be. Experiments have shown that the surface should have a grain size of up to 100 µm.

An especially advantageous refinement of the method according to the invention is also achieved in that, after a first predetermined time period during which activated sludge is fed into the hydrocyclone and separated into a specifically heavy fraction and into a specifically light fraction and during which the heavy fraction as well as the light fraction are returned to the aeration tank, then, surplus sludge that has been withdrawn from the aeration tank, instead of activated sludge, is fed into the hydrocyclone during a second predetermined time period, whereby the surplus sludge is separated in the hydrocyclone into a specifically heavy fraction and into a specifically light fraction, and exclusively the specifically heavy fraction is returned to the aeration tank or else collected and fed into an aeration tank of a second installation, whereas the specifically light fraction is disposed of.

During the first time period, the Planctomycete granules contained in the specifically heavy fraction are washed, or the organic or inorganic cover layer present on the granules is at least partially removed. In contrast, during the second time period, due to the disposal of the light fraction and due to the return of the heavy fraction to the aeration tank of the installation, the slow-growing group of the anaerobic ammonium-oxidizing bacteria (anammox) becomes established in the biological system or in the aeration tank. The fraction of the anaerobic ammonium-oxidizing bacteria (anammox) can be increased during the second time period in such a way that the reaction volume of the tank is correspondingly reduced and the process stability of the installation is enhanced.

In this case, it has proven to be particularly practical for the length of the first time period to be greater than the length of the second time period. In actual practice, it has proven to be advantageous for the length of the first time period to be about 1.5 to 4 times greater than the length of the second time period. Especially preferably, activated sludge is fed into the hydrocyclone during 70% of the total running time of the hydrocyclone, while surplus sludge is fed in during 30% of the total running time. Here, the length of each time period is adapted as a function of the number of hydrocyclones, the size of the individual hydrocyclones and the size of the aeration tank as well as of the nitrogen conversion of the installation that is to be achieved.

According to the invention, it is also provided that activated sludge is fed into the hydrocyclone, alternatingly and continuously, during a first time period, and that surplus sludge is fed in during a second time period. This means that, after the surplus sludge has been fed in during the second time period, this is followed again by a first time period during which activated sludge is then fed into the hydrocyclone.

According to another embodiment of the invention, a deammonifying installation for treating wastewater containing ammonia is provided in which the sludge fed into the hydrocyclone is configured as activated sludge, and the overflow of the hydrocyclone that serves to return the separated specifically light fraction containing mostly aerobic ammonia-oxidizing bacteria (AOB), to the aeration tank is flow-connected to the aeration tank, and in which the at least one hydrocyclone has a cylindrical segment and a conical segment, whereby an inner wall surface of the conical segment is roughened, at least in certain sections, while the roughened inner wall surface of the conical segment has a greater roughness than the inner wall surface of the cylindrical segment.

Such a configuration of the hydrocyclone and of the flow-connection of the hydrocyclone with the aeration tank translates into an improved deammonifying installation for treating wastewater containing ammonia. The installation according to the invention can remove the organic or inorganic cover layers that are present on the Planctomycete granules gently and, at the same time, particularly effectively. The removal of the cover layers that have a diffusion-limiting effect considerably improves the conversion of ammonia and nitrite into elementary nitrogen by the Planctomycetes.

Since the conical segment of the hydrocyclone has a greater roughness than the cylindrical segment, it is ensured that the abrasive forces needed to remove the cover layer are introduced exclusively into the specifically heavy fraction. Since the specifically light fraction, due to its lower density, is carried out through the overflow by means of the inner eddy that is formed and directed upwards inside the hydrocyclone, the specifically light fraction no longer makes direct contact with the roughened inner wall in the conical segment of the hydrocyclone. Therefore, no abrasive forces are introduced into the light fraction, so that the bacteria (AOB), which are present in flocculent form in the light fraction, are not destroyed. In particular, this is very advantageous in view of the much worse settling properties of this sludge fraction. Its destruction would lead to a further deterioration of the settling properties, as a result of which these bacteria would be discharged from the biological system or from the aeration tank and would no longer be available for the deammonification.

It has proven to be particularly practical for the inner wall surface of the conical segment of the hydrocyclone to have a roughness, at least in certain sections, with a grain size of up to 100 μm. If the grain size were larger, the aerobic ammonia-oxidizing bacteria, namely, the Planctomycete granules, which are present in the conglomerate, would be destroyed. The roughness that is to be selected on a case-to-case basis depends especially on the selected diameter of the hydrocyclone. The larger the diameter of the cylindrical segment of the hydrocyclone, the greater the selected roughness should be.

One embodiment of the invention provides that the inner wall surface of the conical segment has a surface coating that exhibits the greater roughness. Here, the surface coating and the inner wall surface of the conical segment can be joined integrally, or else the surface coating could be joined to the inner wall surface of the conical segment by means of a material bond, for example, by gluing.

In this context, it has proven to be especially advantageous for the hydrocyclone to consist, at least partially, of a dimensionally stable plastic and/or for the surface coating to be made of aluminum oxide. This configuration of the hydrocyclone ensures a simple and reproducible production of the hydrocyclone. Here, the hydrocyclone can be manufactured by means of injection molding, whereby the aluminum oxide that forms the surface coating is applied into the mold or onto the core before the plastic is injected. During the cooling phase, the aluminum oxide then bonds with the inner wall surface of the hydrocyclone to form a one-piece component. The embedding of the aluminum oxide into the surface of the hydrocyclone gives rise to a process-safe fixation of the aluminum oxide to the inner wall surface. Either the quantity and/or the grain size of the aluminum oxide can be adapted, depending on the desired grain size of the surface coating.

An especially simple possibility is also achieved in that the surface coating is configured as a film or as a fabric. The coating could then be affixed to the appertaining surfaces of the hydrocyclone by means of a material bond.

According to the invention, it is also provided that the greater roughness of the inner wall surface of the conical segment can be created by a mechanical and/or chemical processing method. Thus, in this case, the roughness can be created directly on or in the inner wall surface of the hydrocyclone.

An advantageous embodiment of the present invention provides that the inner wall surface of the cylindrical segment is configured so as to be smooth. This prevents destruction of the aerobic ammonia-oxidizing bacteria when they come into contact with the inner wall surface of the cylindrical segment.

FIG. 1 shows a deammonifying installation 1 for treating wastewater 2 containing ammonia. The installation 1 can be configured as an SBR (Sequencing Batch Reactor installation), as a conventional activation installation with a secondary treatment stage, or else as a so-called membrane installation with a membrane to hold back the biomass. The installation 1 has at least one aeration tank 3 in which the wastewater 2 is mixed and brought into intensive contact with suspended biomass or activated sludge.

By means of a pump 4, an activated sludge consisting of a mixture of sludge and water is fed from the aeration tank 3 into a hydrocyclone 5 (directional arrow 6). The hydrocyclone 5 has a cylindrical segment 7 and a conical segment 8. The cylindrical segment 7 has a diameter between 50 mm and 250 mm. The hydrocyclone 5 is charged by the pump 4 with an admission pressure that is between 1.1 bar and 2.1 bar, depending on the diameter of the cylindrical segment 7 of the hydrocyclone 5. Via an inlet 9 that opens up into the cylindrical segment 7, the activated sludge is fed into the hydrocyclone 5, where it is separated into a specifically heavy fraction containing mostly anaerobic ammonium-oxidizing bacteria (anammox), especially Planctomycete granules, and into a specifically light fraction containing mostly aerobic ammonia-oxidizing bacteria (AOB), especially Nitrosomas. The specifically heavy fraction is discharged from the hydrocyclone 5 through the conical segment 8 through an underflow 10 and returned to the aeration tank 3 (directional arrow 11). The specifically light fraction is likewise returned to the aeration tank 3 through an overflow 12 of the hydrocyclone 5 (directional arrow 13). Therefore, all of the activated sludge fed from the aeration tank 3 into the hydrocyclone 5 is also returned into the same aeration tank 3, although it is divided into a specifically heavy fraction and a specifically light fraction. The specifically heavy fraction comprises about 80% and the specifically light fraction comprises about 20% of the activated sludge volume fed into the inlet 9 of the hydrocyclone 5.

Figure 2:
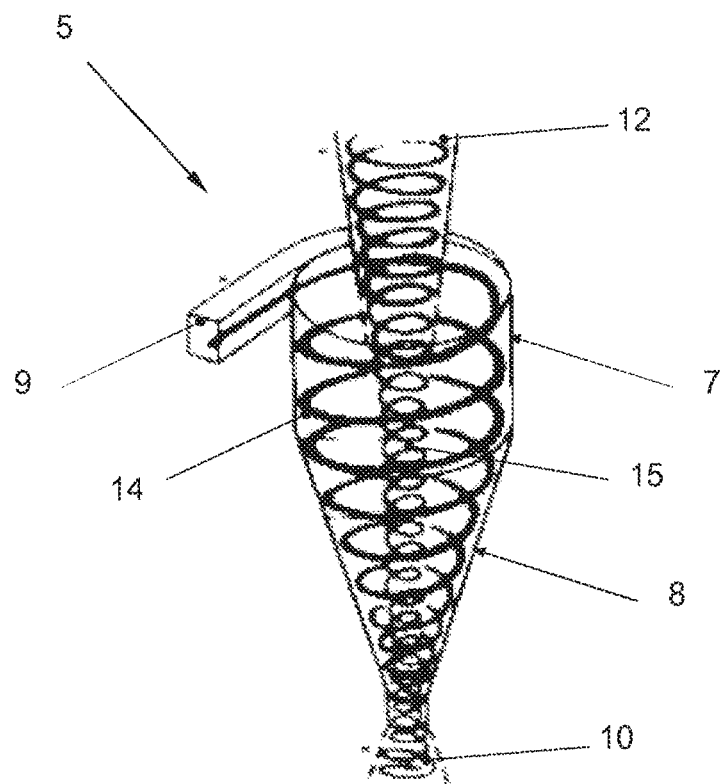
FIG. 2 shows the flow conditions in the hydrocyclone shown in FIG. 1, in a perspective view.
Figure 3:
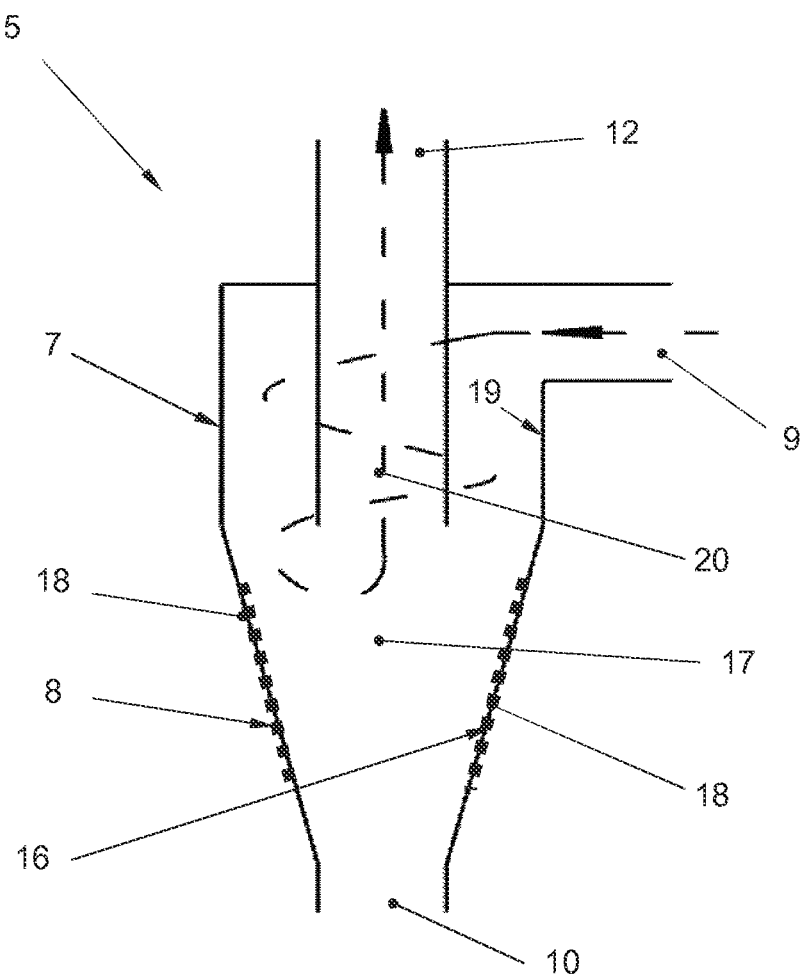
FIG. 3 shows the hydrocyclone shown in FIG. 1 in a side view.

FIG. 2 illustrates the flow conditions in the hydrocyclone 5 shown in FIG. 1, and FIG. 3 shows the hydrocyclone in a side view. The activated sludge from the aeration tank 3 is fed into the cylindrical segment 7 of the hydrocyclone 5 via the inlet 9. As a result, the activated sludge is forced onto an orbit and flows in an outer eddy 14 that is formed and directed downwards. Due to a tapering in the conical segment 8 of the hydrocyclone 5, volume is displaced inwards and an accumulation occurs in the lower area of the conical segment 8, which leads to the formation an inner eddy 15 that is directed upwards and escapes from the hydrocyclone 5 through the overflow 12. The specifically heavy fraction is deposited onto an inner wall surface 16 of the hydrocyclone 5 and discharged from the hydrocyclone 5 through the underflow 10, whereas the specifically light fraction is discharged from the hydrocyclone 5 through the overflow 12. In the hydrocyclone 5 shown, the activated sludge is exposed to centrifugal forces that are 30 to 180 times that of the acceleration of gravity g.

The inner wall surface 16 of the conical segment 8 that faces the inner chamber 17 of the hydrocyclone 5 has a roughened surface coating 18 having a greater roughness than an inner wall surface 19 of the cylindrical segment 7 that likewise faces the inner chamber 17 of the hydrocyclone 5. The surface coating 18 has a grain size of up to 100 μm and consists, for example, of aluminum oxide that is integrally joined to the plastic material of the hydrocyclone 5. The selected roughness of the surface coating 18 depends on the diameter of the selected hydrocyclone 5. The larger the diameter of the cylindrical segment 7, the greater the selected roughness of the surface coating 18 should be.

During the deammonification of the wastewater 2 containing ammonia in the aeration tank 3 of the installation 1, first of all, ammonia is converted into nitrite by means of aerobic ammonia-oxidizing bacteria (AOB). Subsequently, ammonia and nitrite are converted into elementary nitrogen by means of anaerobic ammonium-oxidizing bacteria (anammox), especially by means of Planctomycetes. Here, the Planctomycetes are present in the form of granules composed of several individual bacteria that have a much greater density than the aerobic ammonia-oxidizing bacteria (AOB) that are present in flocculent form. The activated sludge present in the aeration tank 3 is thus fed into the hydrocyclone 5 tangentially through the inlet 9. In the hydrocyclone 5, due to the prevailing centrifugal and flow forces, the activated sludge is then separated into a specifically heavy fraction containing anaerobic ammonium-oxidizing bacteria (Planctomycete granules) having a greater density and into a specifically light fraction containing mostly the aerobic oxidizing (flocculent) bacteria. Through the contact and a relative movement between the rapidly moving anaerobic ammonium-oxidizing bacteria (anammox) in the specifically heavy fraction with a stationary roughened inner wall surface 16 of the hydrocyclone 5, an organic or inorganic cover layer that is present on the Planctomycete granules is at least partially removed before the heavy fraction is then discharged from the hydrocyclone 5 through the underflow 10. In contrast, the specifically light fraction is discharged from the hydrocyclone 5 through the overflow 12 by means of the inner eddy 15 that is forming (broken-line directional arrow 20 in FIG. 3), without making appreciable contact with the roughened inner wall surface 16 in the conical segment 8. After the specifically heavy fraction as well as the specifically light fraction of the activated sludge have been separated in the hydrocyclone 5, they are returned in their entirety to the aeration tank 3.

The abrasive forces or the abrasive effect can be optimally selected through a combination of the size of the hydrocyclone 5, especially of the diameter of the cylindrical segment 7, the roughness of the inner wall surface 16 in the conical segment 8, and the running time of the hydrocyclone 5 in conjunction with the size of the biological system or of the volume of the aeration tank 3.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for treating wastewater containing ammonia in a deammonifying installation including at least one aeration tank, the method comprising:
    converting ammonia into nitrite using aerobic oxidizing bacteria (AOB);
    converting ammonia and nitrite into elementary nitrogen using anaerobic ammonium-oxidizing bacteria (anammox);
    feeding activated sludge, at least at times, from the at least one aeration tank into a hydrocyclone;
    separating the sludge in the hydrocyclone into a specifically heavy fraction containing mostly the anaerobic ammonia-oxidizing bacteria (anammox) and a specifically light fraction containing mostly aerobic ammonia-oxidizing bacteria (AOB), wherein during the separating of the activated sludge, the anaerobic ammonium-oxidizing bacteria (anammox), which has a greater density than the aerobic ammonia-oxidizing bacteria (AOB), are deposited onto a roughened inner wall surface of the hydrocyclone as a result of centrifugal and flow forces in the hydrocyclone and exposed to abrasive forces generated due to a relative movement between the anaerobic ammonium-oxidizing bacteria (anammox) and the roughened inner wall surface of the hydrocyclone;
    at least partially removing an organic or inorganic cover layer disposed on the anaerobic ammonium-oxidizing bacteria (anammox) as a result of the abrasive forces; and returning the specifically heavy fraction and the specifically light fraction to the at least one aeration tank.

2. The method according to claim 1, wherein the ammonium-oxidizing bacteria (anammox) includes Planctomycetes granules and the abrasive forces remove the organic or inorganic cover layer from the Planctomycete granules.

3. The method according to claim 1, wherein the specifically heavy fraction separated in the hydrocyclone and the specifically light fraction of the activated sludge are both returned in their entirety to the at least one aeration tank.

4. The method according to claim 1, wherein the hydrocyclone includes a conical segment comprising the roughened inner wall surface, wherein, during the separation of the activated sludge in the hydrocyclone, the specifically heavy fraction containing mostly the anaerobic ammonia-oxidizing bacteria makes contact with the roughened inner wall surface and is subsequently discharged from the hydrocyclone through an underflow of the hydrocyclone, while the specifically light fraction containing mostly the aerobic ammonia-oxidizing bacteria (AOB) makes contact with a smooth inner wall surface in a cylindrical segment of the hydrocyclone and is subsequently discharged from the hydrocyclone through an overflow of the hydrocyclone.

5. The method according to claim 1, wherein, after a first predetermined time period during which activated sludge is fed into the hydrocyclone and separated into a specifically heavy fraction and into a specifically light fraction and during which the heavy fraction as well as the light fraction are returned to the at least one aeration tank, instead of activated sludge, surplus sludge that has been withdrawn from the at least one aeration tank is fed into the hydrocyclone during a second predetermined time period, whereby the surplus sludge is separated in the hydrocyclone into a specifically heavy fraction and into a specifically light fraction, and exclusively the specifically heavy fraction is returned to the at least one aeration tank or else collected and fed into an aeration tank of a second installation, whereas the specifically light fraction is disposed of.

6. The method according to claim 5, wherein the length of the first predetermined time period is greater than the length of the second predetermined time period.

7. The method according to claim 5, wherein the length of the first predetermined time period is about 1.5 to 4 times greater than the length of the second predetermined time period.

8. The method according to claim 1, wherein activated sludge is fed into the hydrocyclone, alternatingly and continuously, during a first predetermined time period, and that surplus sludge is fed in during a second predetermined time period.

* * * * *